(12) United States Patent
Kidachi

(10) Patent No.: US 9,943,045 B2
(45) Date of Patent: Apr. 17, 2018

(54) EMITTER AND DRIP IRRIGATION TUBE

(71) Applicant: Enplas Corporation, Saitama (JP)

(72) Inventor: Masahiro Kidachi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 15/037,950

(22) PCT Filed: Nov. 26, 2014

(86) PCT No.: PCT/JP2014/081177
§ 371 (c)(1),
(2) Date: May 19, 2016

(87) PCT Pub. No.: WO2015/080127
PCT Pub. Date: Jun. 4, 2015

(65) Prior Publication Data
US 2016/0286740 A1 Oct. 6, 2016

(30) Foreign Application Priority Data

Nov. 27, 2013 (JP) .................................. 2013-245228
Oct. 7, 2014 (JP) .................................. 2014-206490

(51) Int. Cl.
*A01G 25/02* (2006.01)
*B05B 1/20* (2006.01)
(Continued)

(52) U.S. Cl.
CPC ............ *A01G 25/023* (2013.01); *B05B 1/202* (2013.01); *B05B 1/3006* (2013.01); *A01G 25/02* (2013.01); *A01G 25/165* (2013.01); *B05B 12/085* (2013.01)

(58) Field of Classification Search
CPC .... A01G 25/02; A01G 25/023; A01G 25/165; B05B 12/085; B05B 1/202; B05B 1/3006
(Continued)

(56) References Cited

U.S. PATENT DOCUMENTS 4,210,287 A * 7/1980 Mehoudar ............ A01G 25/023
239/109
4,687,143 A 8/1987 Gorney et al.
(Continued)

FOREIGN PATENT DOCUMENTS

EP 444425 A1 9/1991
EP 2594339 A1 5/2013
(Continued)

OTHER PUBLICATIONS

Extended European Search Report for 14865430.4 dated Jun. 13, 2017.
(Continued)

*Primary Examiner* — Darren W Gorman
*Assistant Examiner* — Joseph A Greenlund
(74) *Attorney, Agent, or Firm* — Brundidge & Stanger, P.C.

(57) ABSTRACT

An emitter is arranged inside a tube and has: an emitter main body that is constituted by a resin molded body that has at least a recessed part and a through hole; and a flexible film that is joined to at least one surface of the emitter main body and that forms a flow path by closing off the recessed part and an opening part of at least one part the through hole. The emitter has a discharge amount adjusting part that is for making adjustments in accordance with the water pressure inside the tube. When the pressure of an irrigation liquid that is inside the tube is at or above a set value, the film slackens, and the discharge amount adjusting part narrows the flow path of the liquid and reduces flow rate.

12 Claims, 9 Drawing Sheets

(51) Int. Cl.
 *B05B 1/30* (2006.01)
 *A01G 25/16* (2006.01)
 *B05B 12/08* (2006.01)

(58) Field of Classification Search
 USPC .......................................................... 239/542
 See application file for complete search history.

(56) References Cited

U.S. PATENT DOCUMENTS

| | | | | |
|---|---|---|---|---|
| 6,027,048 | A * | 2/2000 | Mehoudar | A01G 25/023 138/42 |
| 6,302,338 | B1 * | 10/2001 | Cohen | A01G 25/023 137/614.2 |
| 6,945,476 | B2 * | 9/2005 | Giuffre | A01G 25/023 239/542 |
| 7,648,085 | B2 * | 1/2010 | Mavrakis | A01G 25/023 138/40 |
| 8,511,585 | B2 * | 8/2013 | Keren | A01G 25/023 239/533.1 |
| 8,998,113 | B2 * | 4/2015 | Keren | A01G 25/023 239/542 |
| 9,345,205 | B2 * | 5/2016 | Kidachi | A01G 25/023 |
| 2005/0224607 | A1 * | 10/2005 | Dinur | G05D 7/0113 239/542 |
| 2005/0284966 | A1 * | 12/2005 | DeFrank | A01G 25/023 239/542 |
| 2006/0163388 | A1 * | 7/2006 | Mari | A01G 25/023 239/542 |
| 2006/0255186 | A1 | 11/2006 | Ruskin | |
| 2009/0173811 | A1 | 7/2009 | Gorney et al. | |
| 2009/0212135 | A1 * | 8/2009 | Keren | A01G 25/02 239/542 |
| 2009/0266919 | A1 * | 10/2009 | Mavrakis | A01G 25/023 239/542 |
| 2009/0302127 | A1 * | 12/2009 | Lutzki | A01G 25/023 239/11 |
| 2010/0282873 | A1 * | 11/2010 | Mattlin | A01G 25/023 239/542 |
| 2011/0186652 | A1 * | 8/2011 | Cohen | A01G 25/023 239/542 |
| 2012/0160926 | A1 * | 6/2012 | Lutzki | F16K 23/00 239/11 |
| 2012/0305676 | A1 | 12/2012 | Keren | |
| 2015/0150199 | A1 * | 6/2015 | Kidachi | A01G 25/023 239/542 |
| 2016/0205878 | A1 * | 7/2016 | Kidachi | A01G 25/023 |
| 2016/0278311 | A1 * | 9/2016 | Kidachi | A01G 25/023 |
| 2016/0286740 | A1 * | 10/2016 | Kidachi | A01G 25/023 |
| 2016/0286741 | A1 * | 10/2016 | Kidachi | A01G 25/023 |
| 2016/0286742 | A1 * | 10/2016 | Kidachi | A01G 25/023 |
| 2016/0295816 | A1 * | 10/2016 | Kidachi | A01G 25/023 |
| 2016/0309669 | A1 * | 10/2016 | Kidachi | A01G 25/02 |
| 2016/0330917 | A1 * | 11/2016 | Kidachi | A01G 25/023 |
| 2017/0035005 | A1 * | 2/2017 | Kidachi | A01G 25/023 |

FOREIGN PATENT DOCUMENTS

| | | |
|---|---|---|
| JP | 2001-519174 A | 10/2001 |
| JP | 2010-046094 A | 3/2010 |
| WO | 2006/119501 A1 | 11/2006 |

OTHER PUBLICATIONS

International Publication from International Application No. PCT/JP2014/081177 dated Mar. 3, 2015.

* cited by examiner

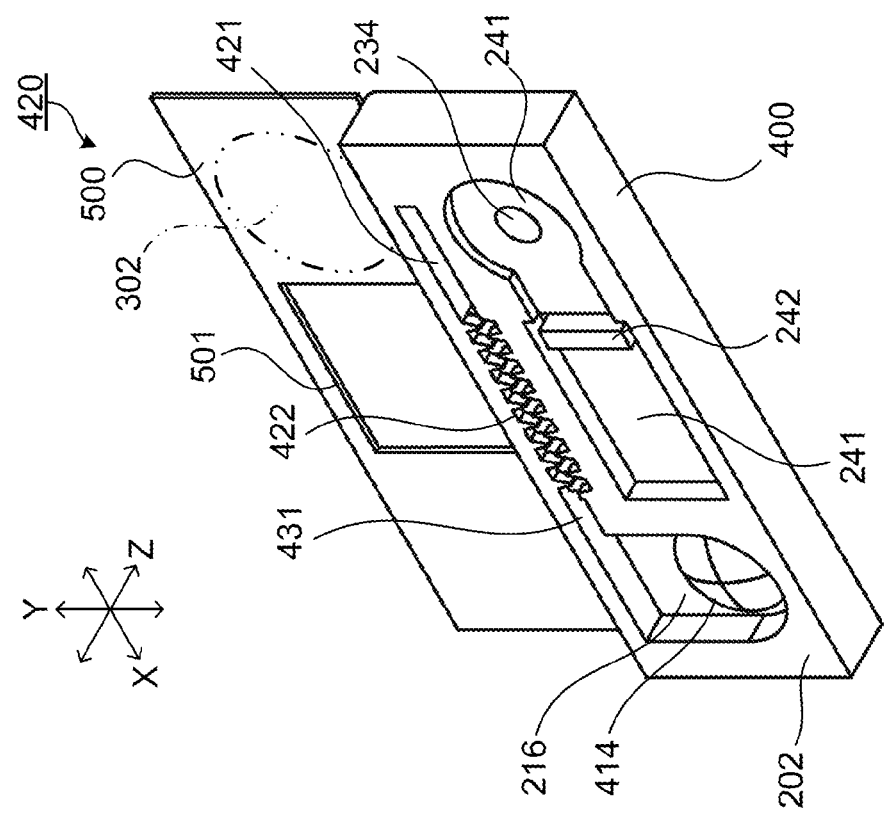
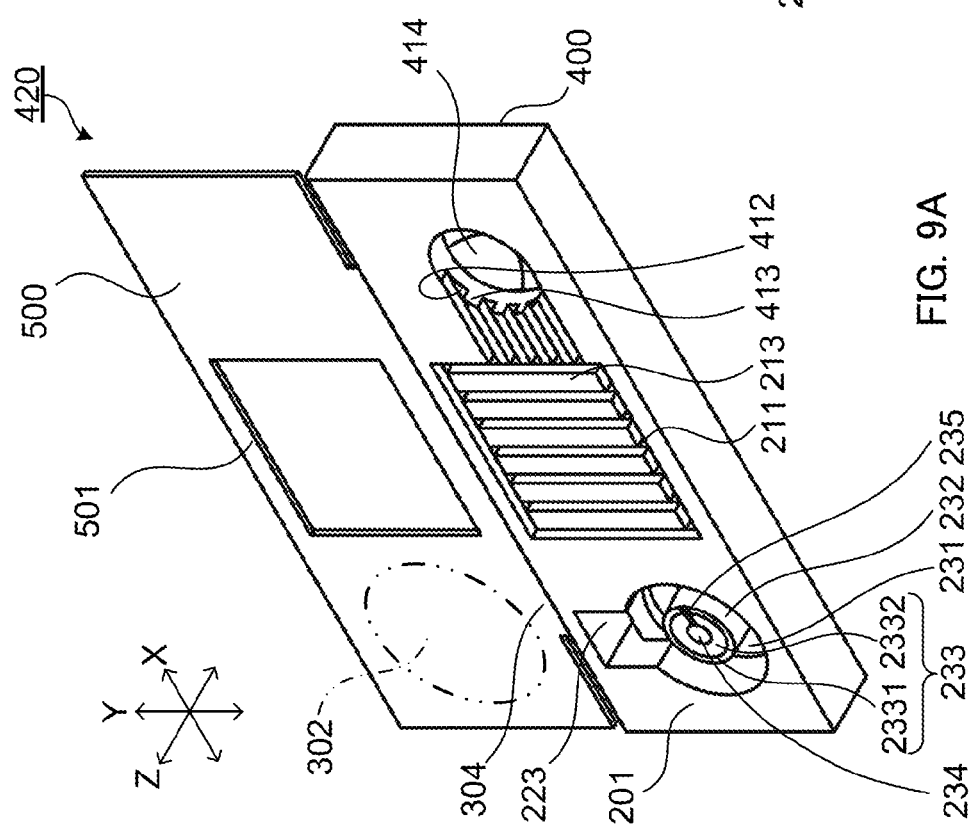
FIG. 9A
FIG. 9B

EMITTER AND DRIP IRRIGATION TUBE

TECHNICAL FIELD

The present invention relates to an emitter and a trickle irrigation tube including the emitter.

BACKGROUND ART

A trickle irrigation method is known as a method for culturing plants. In the trickle irrigation method, for example, a trickle irrigation tube is disposed on the soil in which plants are planted, and irrigation liquid such as water and liquid fertilizer is slowly supplied from the trickle irrigation tube to the soil. The trickle irrigation method can minimize the consumption amount of the irrigation liquid, and has been increasingly attracting attention in recent years.

The trickle irrigation tube typically has a tube and an emitter (also called "dripper"). The emitter typically supplies the soil with the irrigation liquid in the tube at a predetermined rate at which the irrigation liquid is dropped to the soil. Emitters which are pierced into the tube from the outside, and emitters joined to the inner wall surface of the tube are known.

For example, the latter emitter has a channel including a pressure reduction part for allowing the liquid having entered the emitter from the internal space of the tube toward the through hole of the tube while reducing the pressure of the liquid, and a diaphragm part configured to change the volume of a portion of the channel where the irrigation liquid having reduced pressure flows in accordance with the pressure of the liquid of the internal space. The emitter is composed of a member which is joined to the inner wall surface of the tube, a member which is disposed on the member joined to the inner wall surface, and a diaphragm part which is disposed between the two members. The diaphragm part is composed of an elastic film such as a silicone rubber film (see, for example, PTL 1).

The emitter can suppress variation of the discharge rate of the irrigation liquid regardless of change of the pressure of the liquid in the internal space of the tube. Therefore, the emitter is advantageous from the viewpoint of uniformly growing multiple plants.

CITATION LIST

Patent Literature

PTL 1
Japanese Patent Application Laid-Open No. 2010-46094

SUMMARY OF INVENTION

Technical Problem

The emitter is formed by assembling three components. In view of this, the emitter may cause assembling error. In particular, the assembling error of the diaphragm part may cause variation of the operation of the diaphragm part, and variation of the discharge rate of the irrigation liquid.

In addition, the emitter is typically a molded article of an inexpensive resin such as polyethylene and polypropylene, and the diaphragm part is composed of a more expensive elastic material such as a silicone rubber film. The use of components of different materials has a room for improvement in material cost reduction.

Further, in the case of a trickle irrigation tube, hundreds of emitters are disposed in one tube in some cases. In the case of a long trickle irrigation tube, the supply pressure of liquid to the tube is required to be increased. However, when the liquid flows out of the emitter before the pressure of the liquid in the tube is sufficiently raised, the pressure of the liquid in the tube is less likely to be increased, and the discharge rate of the liquid in the emitter may not be stable. On the other hand, when the discharge rate of the liquid from the emitter is increased in accordance with the increase in the pressure of the liquid in the tube, the discharge rate from the emitter disposed on the upstream side in the tube is increased, so that the discharge rate from the emitter disposed on the downstream side may be insufficient. In view of this, proper control of the discharge rate of the liquid in the emitter in accordance with the pressure of the liquid in the tube is desired.

Furthermore, from the viewpoint of reducing the material cost and the manufacturing cost of the emitter, an emitter which can be manufactured with a single inexpensive material and fewer number of components is desired.

An object of the present invention is to provide an emitter which can stabilize the discharge rate of the irrigation liquid and can further reduce the manufacturing cost.

In addition, another object of the present invention is to provide a trickle irrigation tube having the emitter.

Solution to Problem

The present invention provides an emitter for quantitatively discharging irrigation liquid in a tube from a discharge port communicating between an inside and an outside of the tube, the emitter being configured to be joined to an inner wall surface of the tube configured to distribute the irrigation liquid at a position corresponding to the discharge port, the emitter including an emitter main body composed of a resin molded body including at least a recess and a through hole; and a flexible film joined to at least one surface of the emitter main body, the flexible film forming a channel by sealing at least a part of an opening of the recess and the through hole, in which the emitter further includes: an intake part for receiving the irrigation liquid in the tube; a liquid receiving amount regulating part for regulating a flow rate of the irrigation liquid received from the intake part in accordance with a pressure of the irrigation liquid in the intake part; a pressure reduction part for allowing the irrigation liquid supplied from the liquid receiving amount regulating part to flow therethrough while reducing the pressure of the irrigation liquid; a discharge rate regulating part for regulating a flow rate of the irrigation liquid supplied from the pressure reduction part in accordance with the pressure of the irrigation liquid in the tube; and a discharge part to which the irrigation liquid, having a flow rate controlled by the discharge rate regulating part, is supplied, the discharge part being to be facing the discharge port, and the discharge rate regulating part includes: a diaphragm part being a part of the film and being disposed to block a communication between a channel on a downstream side relative to the pressure reduction part and an inside of the tube, a valve seat part depressed with respect to the diaphragm part and disposed at a position where the valve seat part faces the diaphragm part in the channel on the downstream side relative to the pressure reduction part without making contact with the diaphragm part, but the valve seat part being capable of making close contact with the diaphragm part, a hole opening at the valve seat part and communicating with the discharge part, and a groove formed on the valve seat part and configured to communicate between the hole and the channel on outside relative to the valve seat part; and the diaphragm part makes close contact with the valve seat part when the pressure of the irrigation liquid in the tube is equal to or higher than a predetermined value.

Further, the present invention provides a trickle irrigation tube including a tube, and the emitter disposed in the tube.

Advantageous Effects of Invention

The emitter according to the present invention controls the inflow rate of the irrigation liquid into the emitter in accordance with the pressure of the irrigation liquid in the trickle irrigation tube, and thus can stabilize the discharge rate of the irrigation liquid in the emitter. In addition, since the emitter according to the present invention can be formed with one or two components by injection molding of a resin material, the emitter can be produced easily, and the manufacturing cost can be further reduced in comparison with conventional emitters composed of three components. Further, the emitter main body and the film in the emitter according to the present invention may be formed with one type of material, and thus can be recycled or disposed of easily.

BRIEF DESCRIPTION OF DRAWINGS

FIG. 9A illustrates a top surface, a front surface and a side surface of an emitter of Embodiment 2 in the state before the film is joined to an emitter main body, and FIG. 9B illustrates a bottom surface, a front surface and a side surface of the emitter.

DESCRIPTION OF EMBODIMENTS

In the following, embodiments of the present invention are described in detail with reference to the accompanying drawings.

Embodiment 1

Figure 1A:
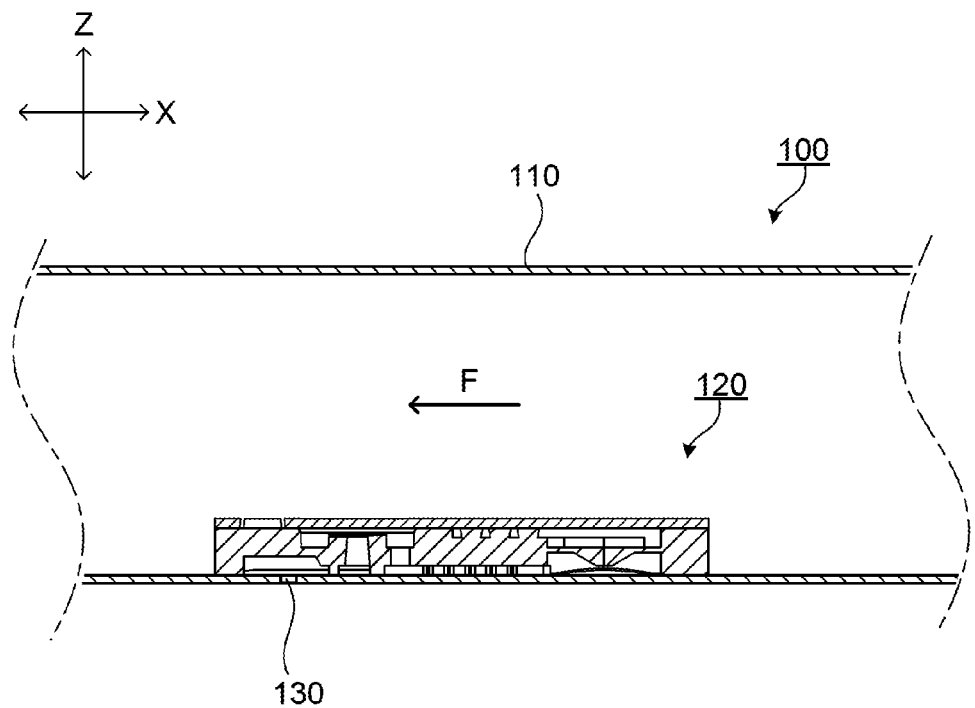
FIG. 1A is a schematic longitudinal sectional view of a trickle irrigation tube according to Embodiment 1 of the present invention.
Figure 1B:
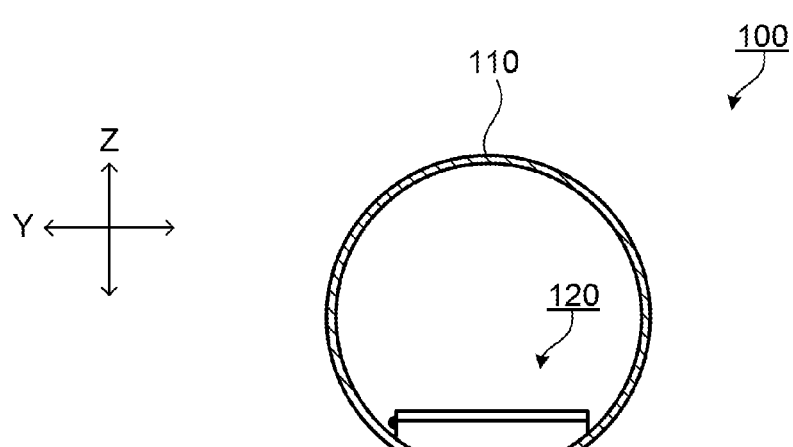
FIG. 1B is a schematic transverse sectional view of the trickle irrigation tube.

FIG. 1A is a schematic longitudinal sectional view of a trickle irrigation tube according to Embodiment 1 of the present invention, and FIG. 1B is a schematic transverse sectional view of the trickle irrigation tube. Trickle irrigation tube 100 is composed of tube 110 and emitter 120. Tube 110 is made of polyethylene, for example.

Emitter 120 is disposed at a predetermined interval (for example, 200 to 500 mm) in the axial direction of tube 110. Each emitter 120 is joined to the inner wall surface of tube 110. Emitter 120 is formed into such a shape as to be easily brought into close contact with tube 110. For example, the shape of a surface (second surface to be described later) joined to the inner wall surface of tube 110 in the cross-section cut by the XZ plane of emitter 120 is a substantially arc shape which protrudes toward the inner wall surface of tube 110 so as to conform to the inner wall surface of tube 110 during water supply. Emitter 120 is disposed at a position where emitter 120 covers discharge port 130 of tube 110. It is to be noted that the X direction indicates the axial direction of tube 110 or the longitudinal direction of emitter 120, Y direction indicates the transverse (width) direction of emitter 120, and the Z direction indicates the height direction of emitter 120.

Discharge port 130 is a hole which extends through the tube wall of tube 110. The hole diameter of discharge port 130 is, for example, 1.5 mm. It is to be noted that arrow F indicates the direction of flow of the irrigation liquid in tube 110.

Figure 2A:
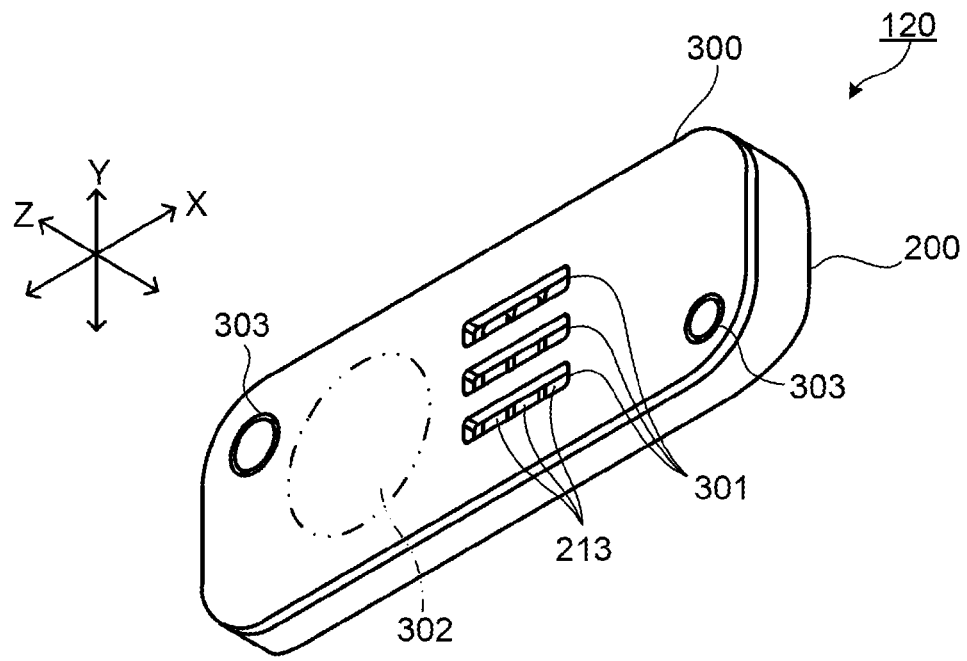
FIG. 2A illustrates a top surface, a front surface and a side surface of the emitter according to Embodiment 1.
Figure 2B:
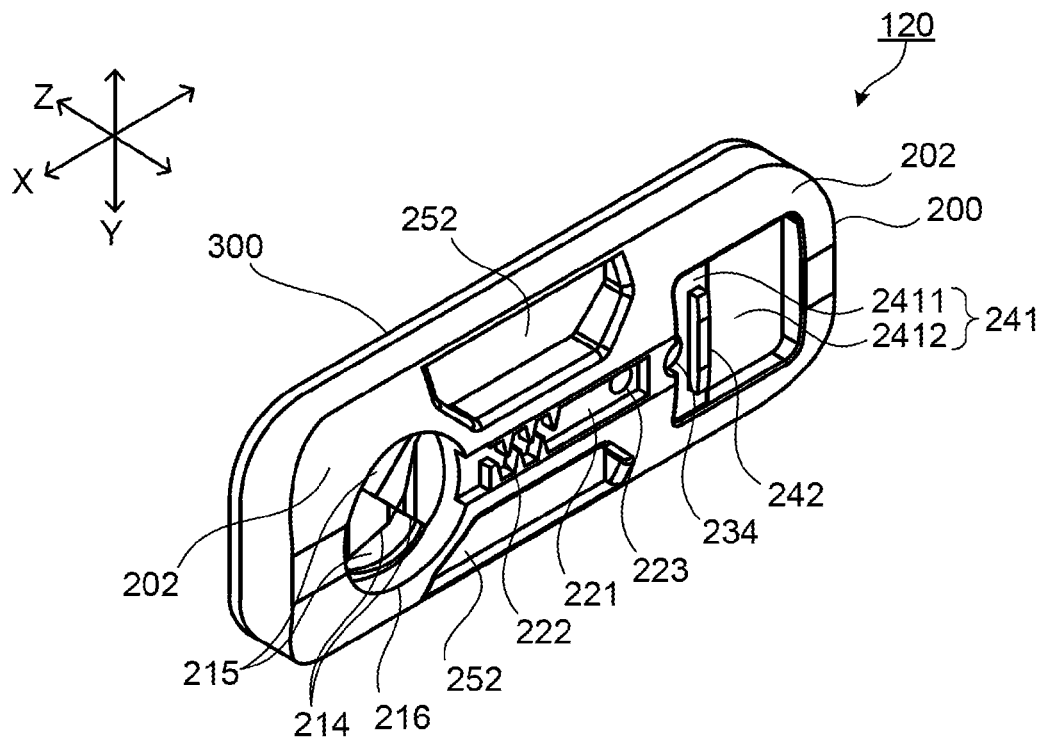
FIG. 2B illustrates a bottom surface, a front surface and a side surface of the emitter.
Figure 3A:
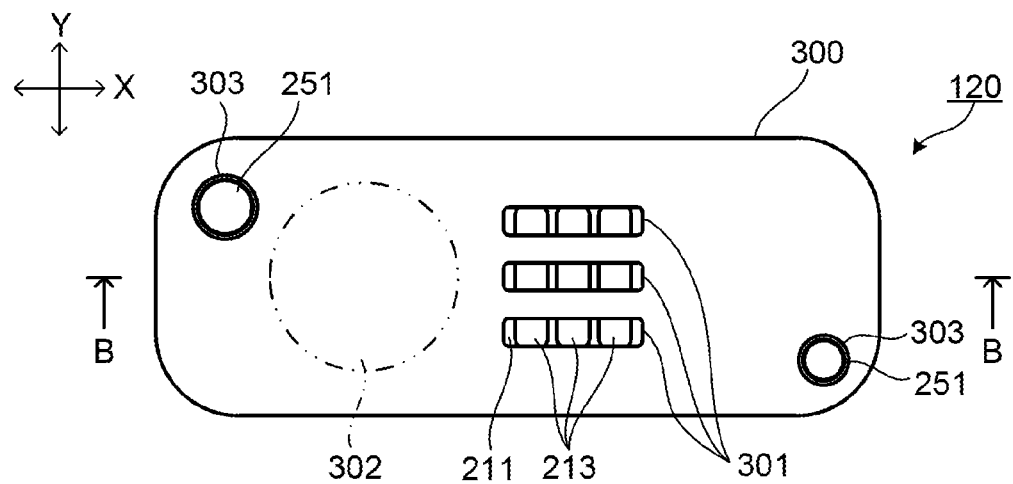
FIG. 3A is a plan view of the emitter according to Embodiment 1.
Figure 3B:
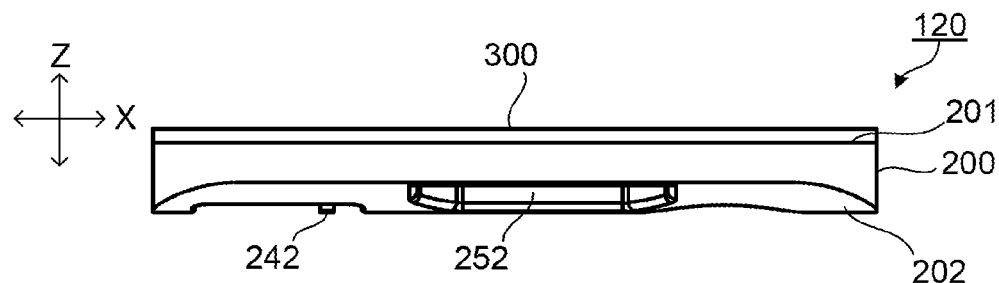
FIG. 3B is a front view of the emitter.
Figure 3C:
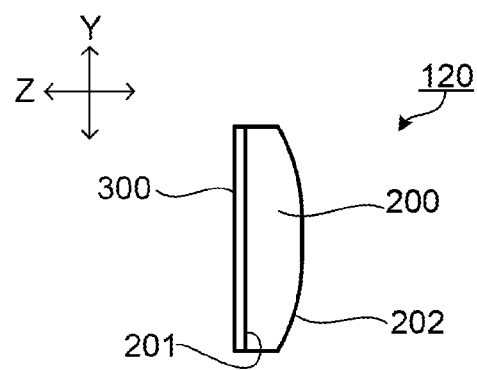
FIG. 3C is a side view of the emitter.
Figure 4A:
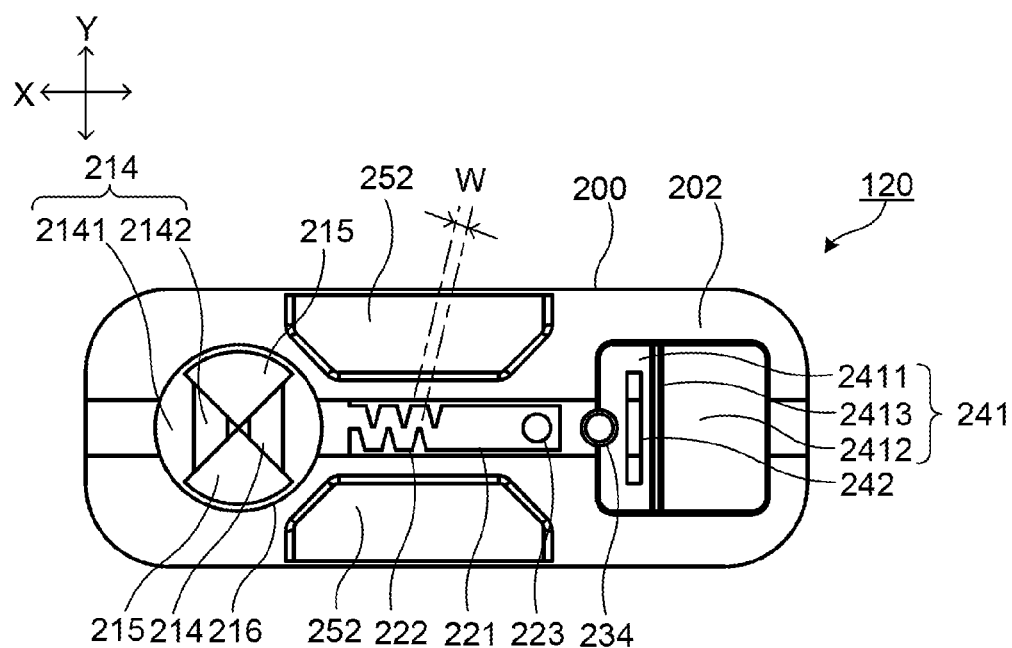
FIG. 4A is a bottom view of the emitter according to Embodiment 1.
Figure 4B:
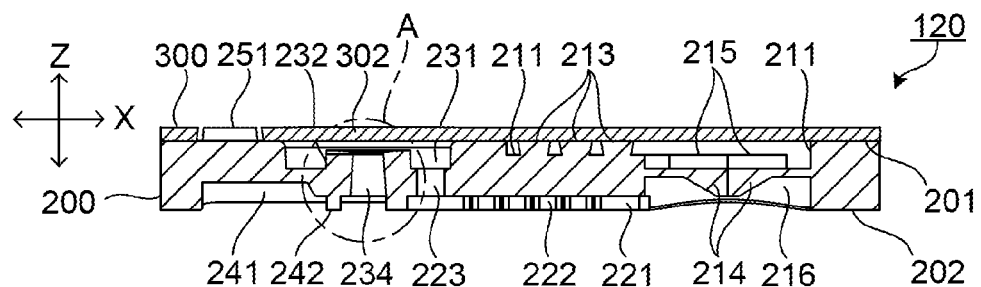
FIG. 4B is a sectional view of the emitter taken along line B-B of FIG. 3A.

FIG. 2A illustrates a top surface, a front surface and a side surface of emitter 120, and FIG. 2B illustrates a bottom surface, a front surface and a side surface of emitter 120. FIG. 3A is a plan view of emitter 120, FIG. 3B is a front view of emitter 120, and FIG. 3C is a side view of emitter 120. FIG. 4A is a bottom view of emitter 120, and FIG. 4B is a sectional view of emitter 120 taken along line B-B of FIG. 3A.

As illustrated in FIG. 2A and FIG. 2B, emitter 120 has a casing-like external shape. The planar shape (shape seen along the Z direction) of emitter 120 is a substantially rectangular shape whose each angle is chamfered round, and the lateral shape (shape seen along the X direction) of emitter 120 is a shape (bell shape) which is formed with a semicircle and a rectangle continuous to the semicircle, as mentioned above. For example, the length of emitter 120 is 26 mm in the X direction, 10 mm in the Y direction, and 2.5 mm in the Z direction.

Emitter 120 is composed of a resin molded body including at least a recess and a through hole, and includes emitter main body 200 to be joined to the inner wall surface of tube 110, and film 300 joined to emitter main body 200. First, film 300 is described.

Film 300 is joined to at least one surface (first surface 201 to be descried later) of emitter main body 200. Film 300 forms a channel by sealing at least a part of openings of the recess and the through hole formed in emitter main body 200. Film 300 has slit 301, diaphragm part 302, and positioning hole 303. Slit 301 is a slender opening along the X direction. Three slits 301 are arranged in parallel at such positions as to overlap protrusion lines 213 to be described later in film 300. The thickness of film 300 is, for example, 0.5 mm.

Diaphragm part 302 is a portion of film 300, to overlap recess 231 and protrusion 232 to be described later. The thickness of diaphragm part 302 is the same as that of other parts of film 300, and the planar shape thereof is circular. It is to be noted that the thickness of diaphragm part 302 can be determined, for example, by computer simulation or an experiment using a trial product on the basis of the deformation amount under a pressure described later.

Positioning holes 303 are two holes having a circular planar shape and extending through film 300, and are disposed, for example, at positions corresponding, respectively, to a pair of opposite angles on a diagonal line of film 300.

Figure 5B:
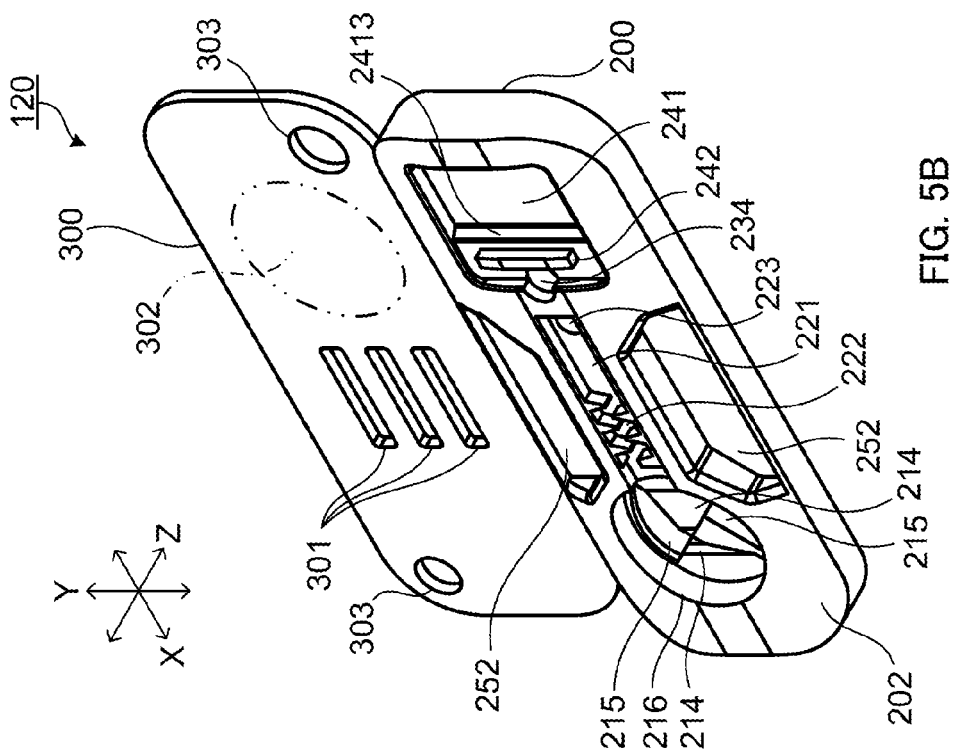
FIG. 5B illustrates a bottom surface, a front surface and a side surface of the molded article.
Figure 5A:
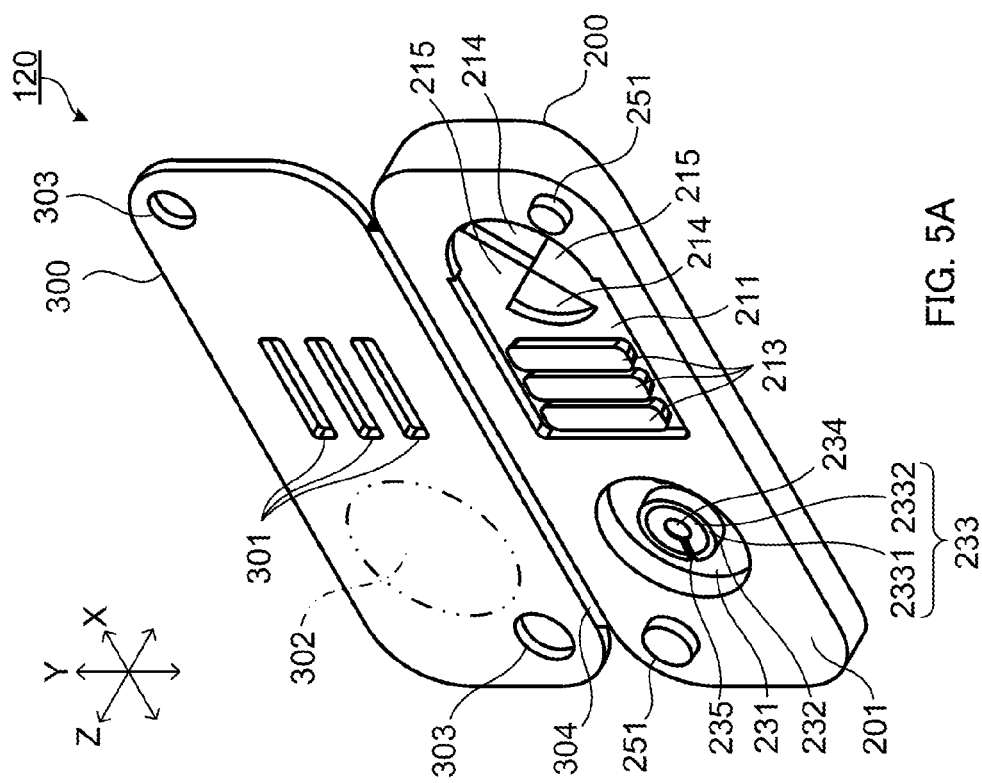
FIG. 5A illustrates a top surface, a front surface and a side surface of an molded article in the state before the film is joined to an emitter main body of Embodiment 1.
Figure 6A:
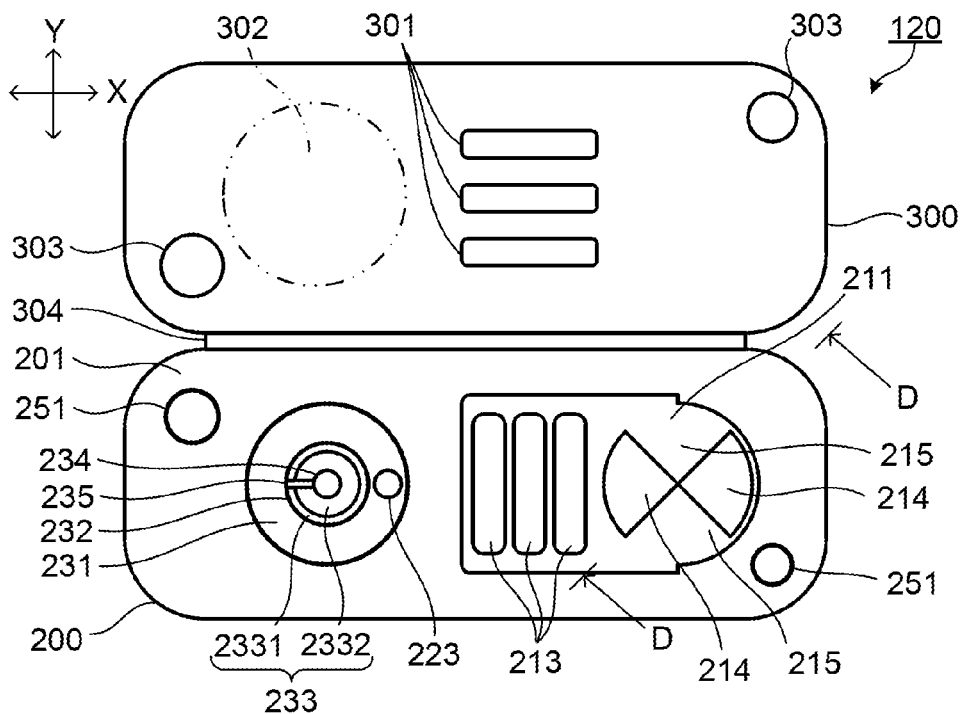
FIG. 6A is a plan view of the molded article in the state before the film is joined to the emitter main body of Embodiment 1.

Next, emitter main body 200 is described. FIG. 5A illustrates a top surface, a front surface and a side surface of an molded article in the state before film 300 is joined to emitter main body 200, and FIG. 5B illustrates a bottom surface, a front surface and a side surface of the molded article. FIG. 6A is a plan view of the molded article, and FIG. 6B is a bottom view of the molded article.

As illustrated in FIG. 5A and FIG. 5B, emitter main body 200 includes first surface 201 and second surface 202. First surface 201 is one surface which is joined to film 300 in the Z direction. Second surface 202 is the other surface which is joined to the inner wall surface of tube 110 in the Z direction. First surface 201 is a planar surface, and second surface 202 is a substantially semi-cylindrical non-planar surface.

Figure 6B:
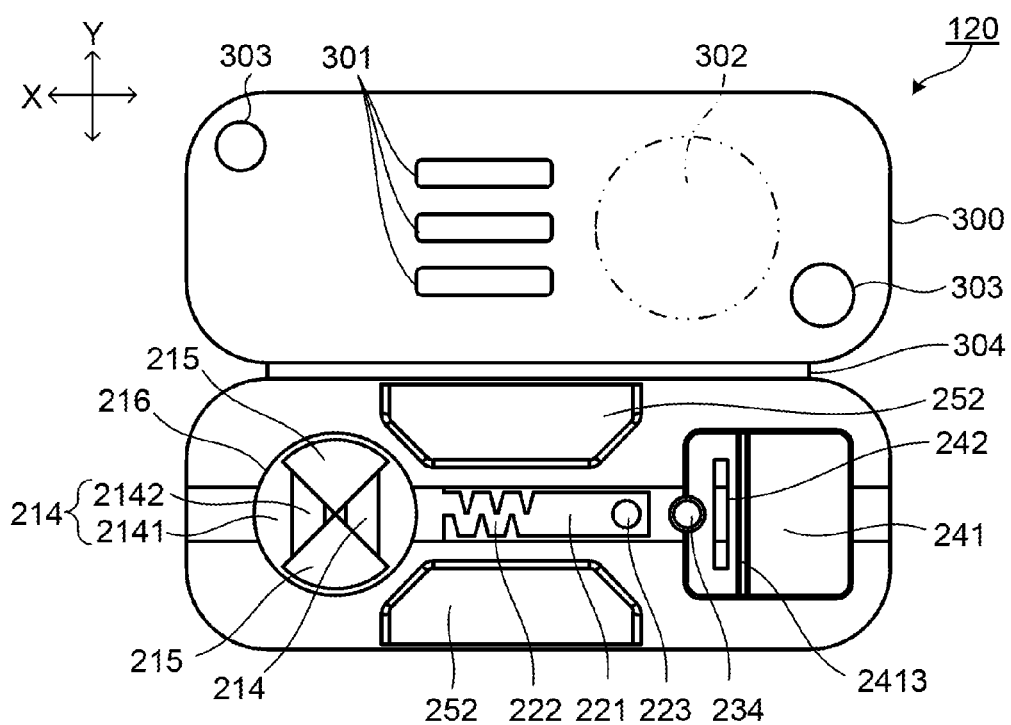
FIG. 6B is a bottom view of the molded article.

As illustrated in FIG. 5A, FIG. 6A, and FIG. 6B, emitter main body 200 is integrally formed with film 300 through hinge part 304. Hinge part 304 is disposed at an edge of first surface 201 of emitter main body 200 in the Y direction. For example, hinge part 304 is a portion having a thickness equal to that of film 300 and a width of 0.5 mm, and is molded integrally with emitter main body 200 and film 300.

As illustrated in FIG. 5A and FIG. 5B, emitter main body 200 includes recess 211, protrusion line 213 disposed in recess 211, valve element 214 and fixed part 215 which are formed on the bottom surface of recess 211, and recess 216 extending from second surface 202 to valve element 214 and fixed part 215. It is to be noted that slit 301, recess 211, and protrusion line 213 constitute an intake part. The intake part may include a screen part from the viewpoint of catching a floating material in the irrigation liquid. In the present embodiment, the screen part is included. As described later, the screen part is composed of slit 301, protrusion line 213, and recess 211. Valve element 214 and fixed part 215 constitute a liquid receiving amount regulating part.

The planar shape of recess 211 is a bell shape composed of a rectangle and a semicircle continuous to one side of the rectangle. The depth of recess 211 from first surface 201 is, for example, 0.5 mm. The diameter of the semicircular portion of this bell shape is, for example, 6 mm.

Protrusion lines 213 are three parallel slender protrusions arranged in the rectangular portion in plan view of recess 211, with the longitudinal direction thereof being the Y direction. The height of protrusion line 213 from the bottom surface of recess 211 to the tip end surface of protrusion line 213 is, for example, 0.5 mm. There is a gap between protrusion lines 213 or between protrusion line 213 and the wall surface of recess 211 in the X direction. There is also a gap between the end portion of protrusion line 213 and the wall surface of recess 211 in the Y direction. As illustrated in FIG. 4B, protrusion line 213 is formed such that the base end portion is shorter than the tip end portion in width in the shape of the cross-section thereof cut by the XZ plane. That is, the gap between protrusion lines 213 or between protrusion line 213 and the wall surface of recess 211 in the X direction becomes greater as the depth of recess 211 is increased. The angle formed by the wall surface of protrusion line 213 with respect to the bottom surface of recess 211 is, for example, 80 to 84°. In this manner, protrusion line 213 forms so-called wedge wire structure inside recess 211.

Each planar shape of valve element 214 and fixed part 215 is a shape of a sector that is one of four sectors into which a circle is divided, and valve element 214 and fixed part 215 are disposed alternately along the circumferential direction. Fixed part 215 has a flat form, and one surface thereof forms the same plane as the bottom surface of recess 211. Valve element 214 has an arc portion being a fixed end and a radius portion being a free end, and is disposed at a position recessed from the bottom surface of recess 211 by the thickness of fixed part 215. That is, the tip of the free end of valve element 214 on the upstream side makes contact with the tip of the free end of fixed part 215 on the downstream side. Valve element 214 and fixed part 215 are both disposed at such positions that each of their free ends intersects the X direction or the Y direction at an angle of 45° when viewed in plan view.

As illustrated in FIG. 5B and FIG. 6B, valve element 214 is composed of flexible thin part 2141 extending from the fixed end and thick part 2142 extending from thin part 2141. The thickness of thin part 2141 is uniform from the arc which is the fixed end, and is sufficiently thinner than that of fixed part 215.

Thick part 2142 is a portion of valve element 214, having a larger thickness toward the downstream side. Thick part 2142 has, for example, a shape of a substantially triangular pyramid protruding toward recess 216. The bottom surface shape of thick part 2142 is an isosceles right triangle with the center of the above-mentioned sector in valve element 214 as a vertex, and thick part 2142 has two wall surfaces being upright from the free end on the downstream side and a slope extending in a sloping manner toward the downstream side from the hypotenuse of the isosceles right triangle. The boundary in plan view between thin part 2141 and thick part 2142 is a straight line. The apex of thick part 2142 is slightly cut out such that, for example, the distance from the inner wall surface of tube 110 to thick part 2142 is about 0.5 mm when emitter 120 is joined to tube 110.

As illustrated in FIG. 5B, the planar shape of recess 216 is a circle having the same diameter as that of the semicircle in the bell shape of recess 211, and the bottom portion of recess 216 is composed of valve element 214 and fixed part 215.

Further, as illustrated in FIG. 5B and FIG. 6B, emitter main body 200 includes recess 221. Recess 221 is a groove extending along the X direction on second surface 202. Recess 221 is in communication with recess 216 at its one end, and the planar shape thereof is substantially rectangular.

The depth of recess 221 from second surface 202 is, for example, 0.5 mm. Recess 221 includes pressure reduction channel part 222 (pressure reduction part) and hole 223.

Pressure reduction channel part 222 is a part formed into a zigzag-shaped groove in plan view. In the zigzag shape, protrusions in a substantially triangular prism shape protruding from the side surface of recess 221 are alternately disposed along the longitudinal direction (X direction) of recess 221. The protrusions are disposed such that the tip of each protrusion does not exceed the central axis of recess 221 when viewed in plan view. Pressure reduction channel part 222 has a depth of, for example, 0.5 mm, and a channel width (W in FIG. 4A) of, for example, 0.5 mm.

Hole 223 opens at the other end portion of recess 221, and extends through emitter main body 200.

Further, as illustrated in FIG. 5A and FIG. 6A, emitter main body 200 includes recess 231, protrusion 232, end surface 233, hole 234, and groove 235. Diaphragm part 302, protrusion 232, end surface 233, hole 234, and groove 235 constitute a discharge rate regulating part.

Recess 231 is a bottomed recess which opens at first surface 201. The planar shape of recess 231 is a shape of a circle, and hole 234 opens at the bottom of recess 231. The diameter of this circle is, for example, 6 mm, and the depth of recess 231 from first surface 201 is, for example, 2 mm.

Protrusion 232 is a substantially cylindrical thick body which is provided in an upright manner from the center portion of the bottom of recess 231. The height of protrusion 232 is smaller than the depth of recess 231. For example, the distance in the Z direction from first surface 201 to protrusion 232 is 0.25 mm.

Figure 8A:
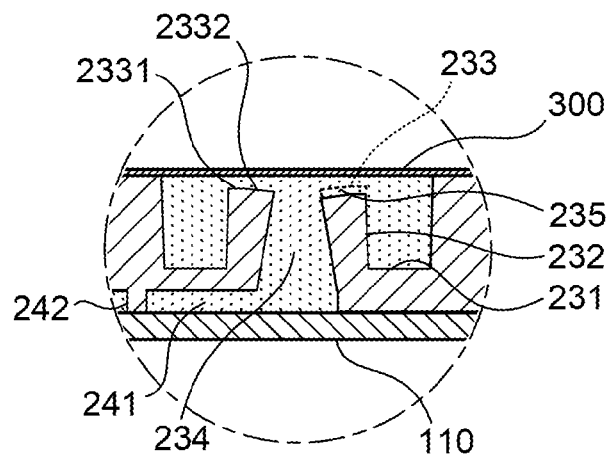
FIG. 8A is an enlarged view of part A of the emitter of FIG. 4B in the case where the pressure of the irrigation liquid in the tube is equal to or higher than a first predetermined value.

End surface 233 is a tip end surface of protrusion 232. The planar shape of end surface 233 is circular, and the diameter thereof is, for example, 3 mm. End surface 233 includes outer ring part 2331 which is parallel to the XY plane, and tilted surface 2332 which is tilted to second surface 202 side from the inner periphery edge of outer ring part 2331 toward the center portion of end surface 233 (FIG. 8A).

Tilted surface 2332 is a curved surface which is slightly depressed with respect to first surface 201 side. Tilted surface 2332 is formed so as to coincide with a virtual curve in contact with the opening edges of recess 231 in a cross-section including the central axis of recess 231. The virtual curve includes a curve which is defined by diaphragm part 302 when diaphragm part 302 receives a pressure of the irrigation liquid in tube 110 having a value equal to or higher than a predetermined value in the above-mentioned cross-section (FIG. 8A and FIG. 8C). The curve has a curvature radius R of, for example, 12 mm. Thus, tilted surface 2332 serves as a valve seat part at which diaphragm part 302 can be seated.

Hole 234 opens at a center of end surface 233, and extends through emitter main body 200. Hole 234 is a tapered hole whose diameter gradually increases from end surface 233 side toward recess 241 side along the Z direction. The opening on end surface 233 side of hole 234 is smaller than the opening on recess 241 side, and the hole diameter of hole 234 on end surface 233 side is, for example, 1 mm.

Groove 235 is formed on end surface 233, and extends from the outer peripheral edge of end surface 233 to hole 234. That is, groove 235 communicates between recess 231 and hole 234. One or more grooves 235 may be provided. For example, groove 235 has a width of 2 mm, and a depth of 0.05 mm.

As illustrated in FIG. 5B and FIG. 6B, emitter main body 200 includes recess 241 and protrusion line 242. Recess 241 serves as a discharge part to face discharge port 130.

The planar shape of recess 241 is substantially rectangular. In more detail, the planar shape of recess 241 is a shape of a combination of first part 2411 on recess 221 side in the X direction, deeper second part 2412, a tilted part 2413 connecting first part 2411 to second part 2412, and hole 234 which opens at the edge of first part 2411 on recess 221 side. Thus, the planar shape of recess 241 is such that the semicircle of hole 234 is connected to one side of the rectangle. The planar shape of each of first part 2411 and second part 2412 is also substantially rectangular. The tilted angle of tilted part 2413 relative to the bottom surface of second part 2412 is, for example, 60°.

Protrusion line 242 is disposed on first part 2411 along the boundary thereof with respect to tilted part 2413. The height of protrusion line 242 is the same as the depth of first part 2411. Protrusion line 242 is spaced apart from hole 234 in the X direction. Further, in the Y direction, the length of protrusion line 242 is shorter than first part 2411, and each end of protrusion line 242 is spaced apart from the inner wall surface of first part 2411. Thus, protrusion line 242 is disposed so as to overlap hole 234 entirely when seen from second part 2412 side along the X direction.

Emitter main body 200 includes protrusions 251 protruding from first surface 201 as illustrated in FIG. 5A and FIG. 6A, and includes recesses 252 opening at second surface 202 as illustrated in FIG. 5B and FIG. 6B.

Protrusion 251 has a planar shape of a circle, and has such a size that allows protrusion 251 to be fitted into positioning hole 303 of film 300. Protrusions 251 are disposed at positions corresponding, respectively, to positioning holes 303.

Recess parts 252 are disposed, respectively, at positions between recess 216 and recess 241 in the X direction and between recess 221 and side edges of emitter main body 200 in the Y direction.

Each of emitter main body 200 and film 300 are molded with one flexible material such as polypropylene, for example. Examples of the material include resin and rubber, and examples of the resin include polyethylene and silicone. The flexibility of emitter main body 200 and film 300 can be adjusted with use of elastic resin materials, and for example, can be adjusted by the type of an elastic resin, the mixing ratio of an elastic resin material to a hard resin material, and the like. An integrally molded article of emitter main body 200 and film 300 can be manufactured by injection molding, for example.

Emitter 120 can be formed by allowing film 300 to turn about hinge part 304, and joining film 300 to first surface 201 of emitter main body 200. For example, film 300 is joined to emitter main body 200 by welding of a resin material of emitter main body 200 or film 300, by bonding using an adhesive agent, by pressure bonding of film 300 to emitter main body 200, or the like. When film 300 is joined to first surface 201, recess 231 is liquid-tightly sealed with diaphragm part 302 to be a part of a channel of the irrigation liquid in emitter 120. Thus, a series of the channel from recess 211 to recess 241 is formed. It is to be noted that hinge part 304 either may remain as it is, or may be removed by cutting.

Trickle irrigation tube 100 is formed by joining second surface 202 of emitter 120 to the inner wall surface of tube 110. Emitter 120 is also jointed to the inner wall surface of tube 110, for example, by welding of a resin material of emitter main body 200 or film 300, by bonding using an adhesive agent, by pressure bonding of emitter main body 200 to tube 110, or the like. Discharge port 130 is formed so as to open at second portion 2412 of emitter 120. Discharge port 130 is typically formed after the joining of emitter 120 to tube 110, but may also be formed before the joining.

Next, the flow of the irrigation liquid in emitter 120 is described. First, water, for example, is supplied as the irrigation liquid inside tube 110. It is to be noted that examples of the irrigation liquid include water, liquid fertilizer, agricultural chemical, and a liquid mixture thereof. Supply of water to trickle irrigation tube 100 is performed in a range where the pressure of the water does not exceed 0.1 MPa for the purpose of preventing damaging of tube 110 and emitter 120. The water in tube 110 passes through slits 301 of film 300, and through the gap between recess 211 and protrusion line 213.

Since the longitudinal direction of slit 301 and the longitudinal direction of protrusion line 213 are orthogonal to each other, there are several openings of recess 211 with respect to tube 110, and an area of each opening is small. Accordingly, a floating material in water inside tube 110 is prevented from intruding into recess 211. Thus, slit 301, protrusion line 213, and recess 211 also constitute a screen part for catching a floating material in water, which are taken into emitter 120 from the inside of tube 110. Further, protrusion line 213 forms so-called wedge wire structure, and thus the pressure loss in water having entered recess 211 is suppressed.

Figure 7A:
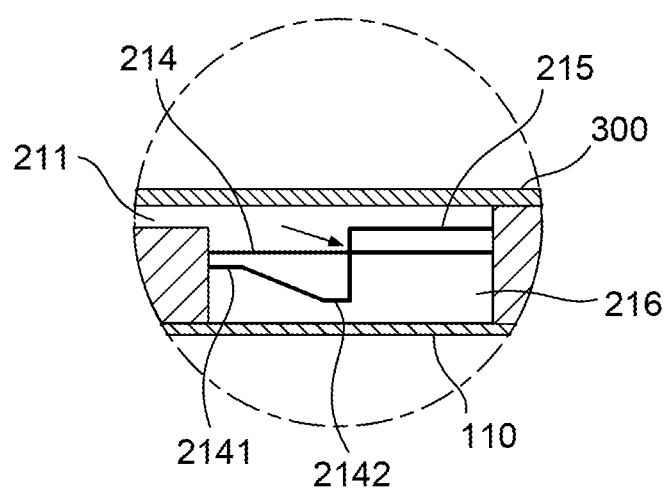
FIG. 7A is an enlarged sectional view of the emitter according to Embodiment 1 taken along line D-D of FIG. 6A in the case where the pressure of irrigation liquid in the tube is lower than a predetermined value.
Figure 7B:
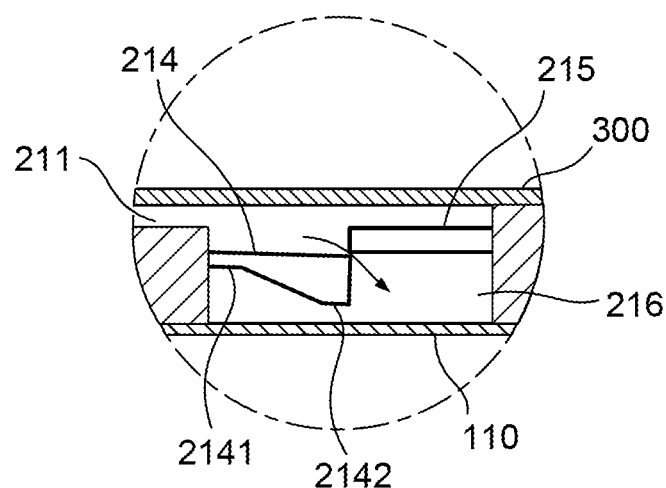
FIG. 7B is an enlarged sectional view of the emitter taken along line D-D of FIG. 6A in the case where the pressure of irrigation liquid in the tube is equal to or higher than the predetermined value.

Water in recess 211 reaches the position of valve element 214 and fixed part 215 inside recess 211. FIG. 7A is an enlarged sectional view of emitter 120 taken along line D-D of FIG. 6A in the case where the pressure of the water in tube 110 is lower than a predetermined value, and FIG. 7B is an enlarged sectional view of emitter 120 taken along line D-D of FIG. 6A in the case where the pressure of the water in tube 110 is equal to or higher than the predetermined value. The arrows in FIG. 7A and FIG. 7B indicate the flow of water.

The water in recess 211 pushes valve element 214 and fixed part 215 from recess 211 side toward recess 216 side. As illustrated in FIG. 7A, when the pressure of the water in recess 211 is lower than a predetermined value (for example, 0.005 MPa), both valve element 214 and fixed part 215 are not bent toward recess 216 side, and thus water channel is closed by valve element 214 and fixed part 215.

As illustrated in FIG. 7B, when the pressure of the water in recess 211 is equal to or higher than the predetermined value, only thin part 2141 is bent while fixed part 215 is not bent, since thin part 2141 is thinner than fixed part 215, so that only valve element 214 opens toward recess 216 side while fixed part 215 does not open toward recess 216 side. Thus, a gap is formed between valve element 214 and fixed part 215, so that the water in recess 211 passes through the gap to be supplied to recess 216.

The water in recess 216 passes through recess 221 to be supplied to pressure reduction channel part 222. The pressure of the water flowing through pressure reduction channel part 222 is reduced as a result of pressure loss caused by the shape (zigzag shape) in plan view of pressure reduction channel part 222. In addition, a floating material in the water is entangled in the turbulent flow generated between the protrusions of pressure reduction channel part 222 and are retained in pressure reduction channel part 222. In this manner, the floating material is further removed from the water by pressure reduction channel part 222.

The water having passed through pressure reduction channel part 222 in which the pressure is reduced and the floating material is removed is supplied into recess 241 through hole 223.

Figure 8B:
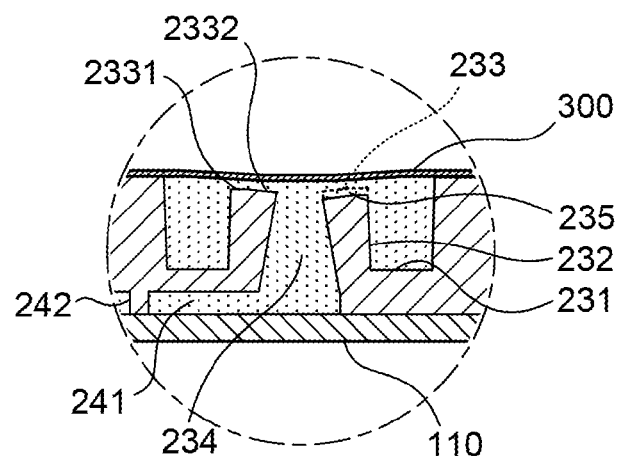
FIG. 8B is an enlarged view of the part A of the emitter in the case where the pressure in the tube is equal to or higher than the first predetermined value to lower than a second predetermined value.
Figure 8C:
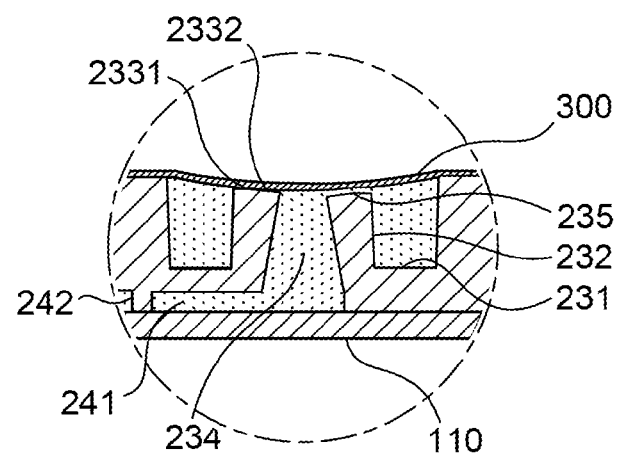
FIG. 8C is an enlarged view of the part A of the emitter in the case where the pressure in the tube is equal to or higher than the second predetermined value.

Here, FIG. 8A is an enlarged view of part A in FIG. 4B in the case where the pressure of the water in tube 110 is equal to or higher than a first predetermined value, FIG. 8B is an enlarged view of the part A in the case where the pressure of the water in tube 110 is equal to or higher than the first predetermined value to lower than a second predetermined value, and FIG. 8C is an enlarged view of the part A in the case where the pressure of the water in tube 110 is equal to or higher than the second predetermined value.

When recess 241 is filled with water, the water is supplied to hole 224 through a gap between film 300 and end surface 233 as illustrated in FIG. 8A. When the pressure of the water in tube 110 is equal to or higher than the first predetermined value (for example, 0.02 MPa), in accordance with the increase in the pressure of the water in tube 110, the flow rate of water in the intake part also increases, and the amount of water to be supplied to recess 231 also increases.

Further, when the pressure of the water in tube 110 is equal to or higher than the first predetermined value, diaphragm part 302 is pushed by the pressure of the water in tube 110 to be bent toward recess 231 side, as illustrated in FIG. 8B. Consequently, the distance between diaphragm part 302 and end surface 233 is reduced. For example, the distance between end surface 233 and diaphragm part 302 is changed to 0.15 mm. Thus, the amount of the water which flows through the gap between end surface 233 and diaphragm part 302 is reduced.

When the pressure of the water in tube 110 is equal to or higher than the second predetermined value (for example, 0.05 MPa), diaphragm part 302 is pushed further toward recess 231 side to be further bent, and is brought into close contact with tilted surface 2332 as illustrated in FIG. 8C. Hole 234 is sealed with diaphragm part 302, but on the other hand end surface 233 includes groove 235, so that groove 235 communicates between recess 231 and hole 234. Accordingly, the water in recess 231 passes through groove 235 to be supplied from recess 231 to hole 234. Therefore, during high water pressure, the flow rate of water in hole 234 is restricted to a constant flow rate which can pass through groove 235.

The water having passed through hole 234 is supplied to recess 241. That is, the water having passed through hole 234 is first supplied to first part 2411, and is supplied to second part 2412 through a gap between the inner wall surface of recess 241 and protrusion line 242. The water supplied to second part 2412 passes through discharge port 130 which opens at second part 2412, and flows out of tube 110. Protrusion line 242 is disposed at a position on a straight line connecting hole 234 and discharge port 130 when emitter 120 is joined to tube 110, and diverts the flow of the water from hole 234 to discharge port 130. Thus, protrusion line 242 serves as a flow guide member for controlling the flow of the water in recess 241 as described above.

In addition, it is considered that, when trickle irrigation tube 100 is used, the root of a plant may intrude into recess 241 from discharge port 130 in search of water. Such intrusion of foreign matters is blocked by protrusion line 242. Accordingly, hole 234 is prevented from being blocked by the foreign matters. Thus, the discharge port includes an intrusion prevention part (protrusion line 242) that prevents the intrusion of foreign matters from discharge port 130.

As is obvious from the above description, emitter 120 is an emitter for quantitatively discharging irrigation liquid (water) in tube 110 from discharge port 130, the emitter being configured to be joined to an inner wall surface of tube 110 at a position corresponding to discharge port 130, the emitter including emitter main body 200 composed of a resin molded body including at least a recess and a through hole; and flexible film 300 joined to at least one surface (first surface 201) of emitter main body 200, the flexible film 300 forming a channel by sealing at least a part of an opening of the recess and the through hole of emitter main body 200, in which the emitter further includes: an intake part for receiving the water in tube 110; a liquid receiving amount regulating part for regulating a flow rate of the water received from the intake part in accordance with a pressure of the water in the intake part; pressure reduction channel part 222 for allowing the water supplied from the liquid receiving amount regulating part to flow therethrough while reducing the pressure of the water; a discharge rate regulating part for regulating a flow rate of the water supplied from pressure reduction channel part 222 in accordance with the pressure of the water in tube 110; and a discharge part to which the water, having a flow rate controlled by the discharge rate regulating part, is supplied, the discharge part being to be facing discharge port 130, in which the discharge rate regulating part includes: diaphragm part 302 being a part of the film and being disposed to block a communication between a channel on a downstream side relative to a pressure reduction part (pressure reduction channel part 222) and an inside of tube 110; a valve seat part (tilted surface 2332) depressed with respect to diaphragm part 302 and disposed at a position where the valve seat part faces diaphragm part 302 in the channel on the downstream side relative to pressure reduction channel part 222 without making contact with diaphragm part 302, but the valve seat part being capable of making close contact with diaphragm part 302; hole 234 opening at the valve seat part and communicating with the discharge part (discharge port 130); and groove 235 formed on the valve seat part and configured to communicate between hole 234 and the channel on outside relative to the valve seat part, and diaphragm part 302 makes close contact with the valve seat part when the pressure of the irrigation liquid in tube 110 is equal to or higher than a predetermined value.

The discharge rate regulating part prevents water from flowing out of emitter 120 excessively when the pressure of the water in tube 110 is high, thus enabling the water to be stably discharged from emitter 120 at a desired rate without depending on the pressure of the water in tube 110.

It is even more effective for end surface 233 to include tilted surface 2332 with which diaphragm part 302 deformed with the pressure of the water in tube 110 can make close contact, from the viewpoint of stably discharging water from emitter 120 at a desired rate.

It is even more effective for emitter 120 to include a screen part composed of slits 301 opening toward the inside of tube 110, and recesses which are gaps between protrusion lines 213 and between protrusion line 213 and the wall surface of recess 211 and which are in communication with slits 301 and extends in a direction orthogonal to the longitudinal direction of slits 301, from the viewpoints of catching a floating material in water taken into emitter 120 from the inside of tube 110, and preventing the change in the flow rate of the water in emitter 120 caused by the floating material.

Since the above-described components of emitter 120 in emitter main body 200 are formed by recesses and through holes formed in emitter main body 200, emitter main body 200 including these components can be produced integrally by injection molding. Thus, it is possible to further reduce the manufacturing cost of emitter 120 compared to conventional emitters composed of three components. Further, emitter 120 can be easily produced by joining emitter main body 200 and film 300 together by bonding, pressure bonding, welding, or the like.

The above-mentioned liquid receiving amount regulating part includes valve element 214 which protrudes from the fixed end in the channel inside emitter 120 and which opens toward the downstream side upon receiving the pressure of water on the upstream side; valve element 214 includes flexible thin part 2141 protruding from the fixed part and thick part 2142 extending from thin part 2141. When the pressure of the water on the upstream side relative to the liquid receiving amount regulating part is equal to or higher than a predetermined value, thin part 2141 is bent, so that valve element 214 opens toward the downstream side.

Thus, it is even more effective for emitter 120 to include the liquid receiving amount regulating part from the viewpoint of stabilizing the discharge rate of water in tube 110 from emitter 120 in accordance with the pressure of the water in tube 110.

Thus, since emitter 120 has valve element 214, emitter 120 can block the inflow of water into emitter 120 when the pressure of the water in tube 110 is low, so that emitter 120 can block the outflow of water from discharge port 130. Therefore, the pressure in tube 110 is maintained high sufficiently and immediately, so that the discharge rate of the water in tube 110 can be stabilized.

It is effective for film 300 to have slit 301 which is orthogonal to protrusion line 213 in recess 211 when viewed in plan view for easily forming a large number of inlets with a small area for the channel inside emitter 120, and is more effective from the viewpoint of preventing the intrusion of a floating material in water inside tube 110 into emitter 120.

It is even more effective for the discharge part to include hole 234 for supplying the water to the discharge part, and for the intrusion prevention part to be disposed at a position on a straight line connecting hole 234 and discharge port 130 when emitter 120 is joined to tube 110 and to be protrusion line 242 (flow guide member) diverting the flow of water from hole 234 to discharge port 130, from the viewpoint of preventing the intrusion of the root of a plant into emitter 120.

Further, emitter 120 can prevent the intrusion of a floating material in water inside tube 110 into emitter 120 since it has the above-mentioned screen part, and can prevent the intrusion of foreign matters from discharge port 130 into emitter 120 since it has the above-mentioned intrusion prevention part. Therefore, it is possible to allow water to flow in emitter 120 stably at a desired flow rate.

It is even more effective for the planar shape of the boundary between thick part 2142 and thin part 2141 to be linear, and for thick part 2142 to be a portion of valve element 214, having a larger thickness toward the downstream side, from the viewpoints of allowing valve element 214 to easily open toward the downstream side, and of setting the predetermined value for opening and closing valve element 214 to be smaller or of opening and closing valve element 214 more accurately.

It is even more effective for the liquid receiving amount regulating part to further include fixed part 215 disposed at a position adjacent to valve element 214 when viewed in plan view, for each of valve element 214 and fixed part 215 to have a planar shape of a sector, and for valve element 214 and fixed part 215 to be disposed alternately in the circumferential direction when viewed in plan view, from the viewpoint of enhancing the productivity of emitter main body 200 by injection molding.

It is even more effective for emitter 120 to be molded with one type of flexible material, and for film 300 to be molded integrally as a part of emitter 120, from the viewpoints of preventing a manufacturing error due to the joining position of film 300, of easiness of recycling and disposal, and of further reduction in manufacturing cost, because both emitter main body 200 and film 300 can be molded as one component by injection molding. Further, the use of the same material is even more effective from the viewpoint of easily joining emitter main body 200 and film 300 together.

It is even more effective for the sectional shape of second surface 202 of emitter main body 200 along the YZ plane to be a substantially arc shape, from the viewpoint of enhancing the joining strength of emitter 120 to the inner wall surface of tube 110.

It is even more effective for film 300 to have positioning hole 303 and for emitter main body 200 to have protrusion 251, from the viewpoints of joining film 300 to a desired position easily and accurately, of enhancing the productivity, and of suppressing the dispersion in quality due to a manufacturing error.

It is even more effective for emitter main body 200 to have recess 252 (lightening hole) from the viewpoints of enhancing the molding accuracy of emitter main body 200, of enhancing the productivity, and of ensuring a desired quality.

It is even more effective for each of valve element 214 and fixed part 215 to have a shape of a sector and to be disposed adjacent to each other, and for valve element 214 and fixed part 215 to be disposed so that the tip of the free end of valve element 214 on the upstream side makes contact with the tip of the free end of fixed part 215 on the downstream side, from the viewpoint of molding both valve element 214 and fixed part 215 simultaneously only by injection molding, since no cutting work is required for valve element 214 and fixed part 215.

It is effective for recess 241 to be composed of shallower first part 2411 on the upstream side and deeper second part 2412 on the downstream side from the viewpoint of preventing further intrusion of the root of a plant toward the upstream side. It is even more effective for protrusion line 242 to be further disposed at first part 2411 from the above-mentioned viewpoints.

It is to be noted that a part of the above-described constituent features of trickle irrigation tube 100 or emitter 120 may be modified, or trickle irrigation tube 100 or emitter 120 may further have other constituent features, as long as the above-described effects are achieved.

For example, tube 110 may be a seamless tube, or may be a tube composed of slender sheet(s) joined together along the longitudinal direction.

In addition, discharge port 130 may be a gap formed at the above-mentioned joining part of the sheet(s) so as to communicate between the inside and the outside of tube 110, or a pipe sandwiched by the sheets at the joining part. Further, the shape of the discharge port in the axial direction may not be a straight line shape. Examples of the tube having the discharge port include a tube in which a depression having a desired shape and serving as a channel is formed on the surface of the above-mentioned sheet(s), and a discharge port composed of the channel is formed at the joining part when the sheets are joined together.

While the intake part of emitter 120 is located at a position on the upstream side in the flow direction of the water in tube 110, the intake part may be located at a position on the downstream side. In addition, the orientations of a plurality of emitters in one tube 110 may be identical to each other or different from each other.

In addition, the planar shapes of protrusion 251 and positioning hole 303 are not limited to a circular shape, and may be a quadrangular or triangular shape.

Further, the resin material of emitter main body 200 and the resin material of film 300 may be identical to each other or different from each other.

While emitter main body 200 is integrally molded by injection molding of resin, emitter main body 200 may be composed of two components of a first surface 201 side component and a second surface 202 side component. In this case, the first surface 201 side component is integrally molded with film 300. With the configuration in which emitter main body 200 is composed of the two components, a channel such as the pressure reduction channel can be disposed inside emitter main body 200. It is to be noted that the two components may be integrally molded through a hinge part.

While the above-mentioned screen part is composed of a plurality of slits 301 arranged in parallel, and a plurality of the recesses arranged in parallel and extending in a direction orthogonal to the longitudinal direction of slits 301, one slit 301 and one recess may be provided. Further, while the screen part includes the wedge wire structure, this structure does not need to be included. For example, protrusion line 213 may be provided upright vertically from the bottom of recess 211.

While the liquid receiving amount regulating part is composed of valve element 214 and fixed part 215, valve element 214 and fixed part 215 do not need to be disposed alternately in the planar direction (circumferential direction); or alternatively the liquid receiving amount regulating part may be composed of only valve element 214 without fixed part 215 being included. Further, it is sufficient for valve element 214 to be a valve element which opens moderately with a predetermined water pressure or higher; for example, valve element 214 may be a segment having a uniform thickness.

Further, the liquid receiving amount regulating part may be composed of other components. For example, the liquid receiving amount regulating part may be composed of a part separating recess 211 and recess 216, and a plurality of fine pores which extend through the part or protrusions such as burrs being upright at the fine pores and at the edge of the openings on the upstream side thereof. Also with such a configuration, it is possible to properly regulate the amount of water collection in accordance with the water pressure on the upstream side of the liquid receiving amount regulating part.

It is sufficient for the pressure reduction part to moderately lower the pressure of water to be supplied to the discharge rate regulating part; for example, the pressure reduction part may be a channel having a planar shape of a straight line, or alternatively may be a channel whose channel area varies in accordance with the pressure of the water in tube 110. Further, the pressure reduction part may be a groove on first surface 201 of emitter main body 200 covered with film 300.

While the above-mentioned valve seat part is tilted surface 2332 which can make close contact with diaphragm part 302 in the present embodiment, the valve seat part may adopt other suitable configurations as long as it can make close contact with diaphragm part 302 at a position around hole 234, and may be, for example, a planar part.

While, in the above-mentioned discharge rate regulating part, diaphragm part 302 directly opens and closes a channel (hole 234) in emitter 120, a configuration may also be adopted, in which a lid disposed to freely open and close the channel in emitter 120 is opened and closed by diaphragm part 302 that moves closer to or away from the lid. Also with such a discharge rate regulating part, it is possible to properly regulate the discharge rate in accordance with the pressure of the water in tube 110.

Further, the above-mentioned intrusion prevention part does not need to be the above-mentioned flow guide member as long as the intrusion prevention part can prevent the intrusion of a root or the like into hole 234 from discharge port 130. For example, the intrusion prevention part may be a grating or a screen disposed at the same position as the flow guide member, or alternatively may be a baffle plate disposed so as to guide an intruding root toward the opposite side of hole 234 from discharge port 130.

It is to be noted that second surface 202 may be a planar surface.

Second Embodiment

A trickle irrigation tube according to Embodiment 2 is composed of tube 110 and emitter 420. The trickle irrigation tube according to the present embodiment differs from the trickle irrigation tube according to Embodiment 1 only in the configuration of emitter 420. Thus, the same reference sign is assigned to the same component as that of emitter 120 according to Embodiment 1, with the description therefor being omitted, and different components are described.

Emitter 420 is composed a resin molded body including at least a recess and a through hole, and includes emitter main body 400 joined to the inner wall surface of tube 110, and film 500 joined to emitter main body 400.

FIG. 9A illustrates a top surface, a front surface and a side surface of emitter 420 according to Embodiment 2 in the state before film 500 is joined to emitter main body 400, and FIG. 9B illustrates a bottom surface, a front surface and a side surface of emitter 420.

Film 500 is joined to first surface 201 of emitter main body 400. Film 500 has rectangular opening 501 at a position corresponding to recess 211 when film 500 covers first surface 201.

As illustrated in FIG. 9A and FIG. 9B, emitter main body 400 includes an intake part formed on first surface 201, a liquid receiving amount regulating part extending through emitter main body 400 in the Z direction, pressure reduction channel part (pressure reduction part) 422 formed on second surface 202, a discharge rate regulating part opening at first surface 201, and recess 241 formed on second surface 202 and functioning as a discharge part.

The intake part includes recess 211, protrusion line 213 disposed in recess 211, recess 412, and protrusion line 413 disposed in recess 412.

Recess 412 is formed on first surface 201, and connects between recess 211 and the liquid receiving amount regulating part. The distance from the bottom surface of recess 412 to the tip end surface of protrusion line 413 (height of protrusion line 413) is, for example, 0.5 mm.

Protrusion lines 413 constitute a screen part that catches a floating material in irrigation liquid together with recess 412. Protrusion lines 413 are three protrusions arranged in parallel in the Y direction in recess 412, with the X direction being the longitudinal direction. A gap is formed between the end portion of protrusion lines 413 in the X direction and protrusion line 213 adjacent to protrusion lines 413 in the X direction.

The liquid receiving amount regulating part has valve element 414. Valve element 414 is composed of four flexible opening-closing parts. The opening-closing parts have a form in which a substantially hemisphere thin dome protruding from first surface 201 side toward second surface 202 side is divided with slits in a cross shape. When the pressure of the irrigation liquid in tube 110 is equal to or higher than a predetermined value (for example, 0.005 MPa), valve element 414 is pushed toward second surface 202 side, so that the slits of valve element 414 are expanded. Thus, the irrigation liquid is taken into emitter main body 400. When the pressure of the irrigation liquid is lower than the predetermined value, valve element 414 suppresses the inflow of the irrigation liquid into emitter main body 400. The shape of valve element 414 is not particularly limited as long as valve element 414 can regulate the flow rate of liquid; valve element 414 does not need to have fixed part 215 as in Embodiment 1.

Pressure reduction channel part 422 is a part formed into a zigzag-shaped groove in plan view. In the zigzag shape, protrusions in a substantially triangular prism shape protruding from the side surface of groove 421 are alternately disposed along the longitudinal direction (X direction) of groove 421. The pressure of water passing through pressure reduction channel part 422 is reduced, and a floating material in the water is removed. While pressure reduction channel part 422 differs from the pressure reduction channel part in Embodiment 1 in the disposition thereof and the number of protrusions, the disposition and the number of protrusions are not particularly limited as long as the above-mentioned functions can be performed.

The discharge rate regulating part includes recess 231, protrusion 232, end surface 233, hole 234, and groove 235. The respective components of the discharge rate regulating part are similar to those in Embodiment 1, and thus the descriptions therefor are omitted.

As illustrated in FIG. 9B, one end of pressure reduction channel part 422 is connected to the liquid receiving amount regulating part via linear groove 431 formed on second surface 202, and the other end of pressure reduction channel part 422 is connected to linear groove 421 formed on second surface 202. Groove 421 is further connected to the discharge rate regulating part via hole 223 which extends through emitter main body 400 from groove 421 and opens at first surface 201. Grooves 431 and 421 and hole 223 have a width (length in the Y direction) of, for example, 1 mm.

As described above, emitter 420 according to Embodiment 2 differs from emitter 120 according to Embodiment 1 in the shape of film 500, and the shapes of protrusion line 413, the liquid receiving amount regulating part and pressure reduction channel part 422 of emitter main body 400. Hereinafter, the dropping of the irrigation liquid by emitter 420 is described.

The irrigation liquid in tube 110 passes through opening 501 of film 500, and through a gap between recess 211 and protrusion line 213. Then, the irrigation liquid passes through a gap between recess 412 and protrusion 413 to reach the liquid receiving amount regulating part.

Thus, the irrigation liquid having reached the liquid receiving amount regulating part is taken into emitter main body 400 from the liquid receiving amount regulating part. Specifically, when the pressure of the irrigation liquid in tube 110 is equal to or higher than a first predetermined value, valve element 414 is pushed toward second surface 202 side, so that the slits of valve element 414 are expanded. Thus, the irrigation liquid having reached the liquid receiving amount regulating part is taken into emitter main body 400 from the liquid receiving amount regulating part.

The irrigation liquid taken from the liquid receiving amount regulating part passes through recess 216 and groove 431 to be supplied to pressure reduction channel part 422. The irrigation liquid having passed through pressure reduction channel part 422 in which the pressure is reduced and the floating material is removed passes through groove 421 and hole 223 to be supplied into recess 231 of the discharge rate regulating part. When recess 231 is filled with the irrigation liquid, the irrigation liquid passes through a gap between film 500 and end surface 233 to be supplied to hole 234 of protrusion 232.

The irrigation liquid having passed through hole 234 reaches a discharge part (recess 241), and is discharged out of tube 110 through discharge port 130 opening to recess 241 which functions as the discharge part.

As described above, emitter 420 according to Embodiment 2 also has functions similar to those of emitter 120 according to Embodiment 1.

As is obvious from the above description, emitter 420 includes an intake part for receiving irrigation liquid in tube 110; a liquid receiving amount regulating part for regulating a flow rate of the water received from the intake part in accordance with a pressure of the water in the intake part; pressure reduction channel part (pressure reduction part) 422 for allowing the irrigation liquid received from the intake part and the liquid receiving amount regulating part to flow therethrough while reducing the pressure of the irrigation liquid; a discharge rate regulating part for regulating a flow rate of the irrigation liquid supplied from pressure reduction channel part 422 in accordance with the pressure of the irrigation liquid in tube 110; and recess 241 which functions as a discharge part to which the irrigation liquid, having a flow rate controlled by the discharge rate regulating part, is supplied, the discharge part being to be facing discharge port 130. The discharge rate regulating part includes: an opening which opens at first surface 201; flexible film 500 sealing the opening and blocking a communication between a channel on a downstream side relative to pressure reduction channel part 422 and an inside of tube 110; a recessed surface part (tilted surface 2332) depressed with respect to film 500 and disposed at a position where the recessed surface part faces film 500 in the channel on the downstream side relative to pressure reduction channel part 422 without making contact with film 500, but the recessed surface part being capable of making close contact with film 500; hole 234 opening at the recessed surface part and communicating with the discharge part (recess 241); and groove 235 formed on the recessed surface part and configured to communicate between hole 234 and the channel on outside relative to the recessed surface part. Emitter 420 is adhered to a position corresponding to discharge port 130 of the inner wall surface of tube 110, thereby allowing emitter 420 to be disposed in tube 110, so as to configure a trickle irrigation tube. Film 500 starts to bend when the pressure of the irrigation liquid in tube 110 is equal to or higher than the first predetermined value, and makes close contact with the recessed surface part when the pressure of the irrigation liquid in tube 110 is equal to or higher than the second predetermined value. Therefore, emitter 420 discharges the irrigation liquid such that the amount of the liquid is limited to the amount which passes through groove 235 even when the pressure of the irrigation liquid in tube 110 increases. In this manner, emitter 420 quantitatively discharges the irrigation liquid in tube 110 from discharge port 130 in accordance with the pressure of the irrigation liquid in tube 110, and thus can stabilize the discharge rate of the irrigation liquid.

While the valve seat part is tilted surface 2332 which can make close contact with film 500, the valve seat part may have other suitable shapes also in the present embodiment as long as the valve seat part can make close contact with film 500 around hole 234; the valve seat part may be a planar part, for example.

Film 500 does not include positioning hole 303 according to Embodiment 1, and emitter main body 400 does not include protrusion 251. While it is preferable to include positioning hole 303 and protrusion 251 from the viewpoint of facilitating the joining between film 500 and emitter main body 400, positioning hole 303 and protrusion 251 do not need to be included as long as at least a part of openings of the recess and the through hole formed in emitter main body 400 can be sealed to form a channel This application is entitled to and claims the benefit of Japanese Patent Application No. 2013-245228 filed on Nov. 27, 2013 and Japanese Patent Application No. 2014-206490 filed on Oct. 7, 2014, the disclosure each of which including the specification, drawings and abstract is incorporated herein by reference in its entirety.

INDUSTRIAL APPLICABILITY

According to the present invention, an emitter which can drop liquid to be dropped with an appropriate speed by the pressure of the liquid can be easily provided. Accordingly, popularization of the above-mentioned emitter in technical fields such as trickle irrigations and endurance tests where long-term dropping is required, and further development of the technical fields can be expected.

REFERENCE SIGNS LIST

100 Trickle irrigation tube
110 Tube
120, 420 Emitter
130 Discharge port
200, 400 Emitter main body
201 First surface
202 Second surface
211, 216, 221, 231, 241, 252, 412 Recess
213, 242, 413 Protrusion line
214, 414 Valve element
215 Fixed part
222, 422 Pressure reduction channel part
223, 234 Hole
232, 251 Protrusion
233 End surface
235, 421, 431 Groove
300, 500 Film
301 Slit
302 Diaphragm part
303 Positioning hole
304 Hinge part
501 Opening
2141 Thin part
2142 Thick part
2331 Outer ring part
2332 Tilted surface
2411 First part
2412 Second part
2413 Tilted part

The invention claimed is:

1. An emitter for quantitatively discharging irrigation liquid in a tube from a discharge port communicating between an inside and an outside of the tube, the emitter being configured to be joined to an inner wall surface of the tube configured to distribute the irrigation liquid at a position corresponding to the discharge port, the emitter comprising:
an emitter main body composed of a resin molded body including at least a recess and a through hole;
a flexible film joined to at least one surface of the emitter main body, the flexible film forming a channel by sealing at least a part of an opening of the recess and the through hole,
wherein:
the emitter further comprises:
an intake part for receiving the irrigation liquid in the tube,
a liquid receiving amount regulating part for regulating a flow rate of the irrigation liquid received from the intake part in accordance with a pressure of the irrigation liquid in the intake part,
a pressure reduction part for allowing the irrigation liquid supplied from the liquid receiving amount regulating part to flow therethrough while reducing the pressure of the irrigation liquid,
a discharge rate regulating part for regulating a flow rate of the irrigation liquid supplied from the pressure reduction part in accordance with the pressure of the irrigation liquid in the tube, and
a discharge part to which the irrigation liquid, having a flow rate controlled by the discharge rate regulating part, is supplied, the discharge part being to be facing the discharge port;
the discharge rate regulating part includes:
a diaphragm part being a part of the film and being disposed to block a communication between a channel on a downstream side relative to the pressure reduction part and an inside of the tube,
a valve seat part depressed with respect to the diaphragm part and disposed at a position where the valve seat part faces the diaphragm part in the channel on the downstream side relative to the pressure reduction part without making contact with the diaphragm part, but the valve seat part being capable of making close contact with the diaphragm part,
a hole opening at the valve seat part and communicating with the discharge part, and
a groove formed on the valve seat part and configured to communicate between the hole and the channel on outside relative to the valve seat part;
the diaphragm part makes close contact with the valve seat part when the pressure of the irrigation liquid in the tube is equal to or higher than a predetermined value;
the liquid receiving amount regulating part includes a valve element protruding from a fixed end in the channel of the irrigation liquid inside the emitter, the valve element opening toward the downstream side upon receiving the pressure of the irrigation liquid on an upstream side;
the valve element includes a flexible thin part, and a thick part extending from the thin part; and
when the pressure of the irrigation liquid on the upstream side relative to the liquid receiving amount regulating part is equal to or higher than a predetermined value, the thin part is bent, and the valve element opens toward the downstream side.

2. The emitter according to claim 1, wherein:
a planar shape of a boundary between the thick part and the thin part is linear, and the thick part is a portion of the valve element, the portion having a larger thickness toward a downstream side of the valve element.

3. The emitter according to claim 1, wherein:
the liquid receiving amount regulating part further includes a fixed part disposed at a position adjacent to the valve element when viewed in plan view,
each of the valve element and the fixed part has a planar shape of a sector, and
the valve element and the fixed part are disposed alternately in a circumferential direction when viewed in plan view.

4. An emitter for quantitatively discharging irrigation liquid in a tube from a discharge port communicating between an inside and an outside of the tube, the emitter being configured to be joined to an inner wall surface of the tube configured to distribute the irrigation liquid at a position corresponding to the discharge port, the emitter comprising:
an emitter main body composed of a resin molded body including at least a recess and a through hole;
a flexible film joined to at least one surface of the emitter main body, the flexible film forming a channel by sealing at least a part of an opening of the recess and the through hole,
wherein:
the emitter further comprises:
an intake part for receiving the irrigation liquid in the tube,
a liquid receiving amount regulating part for regulating a flow rate of the irrigation liquid received from the intake part in accordance with a pressure of the irrigation liquid in the intake part,
a pressure reduction part for allowing the irrigation liquid supplied from the liquid receiving amount regulating part to flow therethrough while reducing the pressure of the irrigation liquid,
a discharge rate regulating part for regulating a flow rate of the irrigation liquid supplied from the pressure reduction part in accordance with the pressure of the irrigation liquid in the tube, and
a discharge part to which the irrigation liquid, having a flow rate controlled by the discharge rate regulating part, is supplied, the discharge part being to be facing the discharge port;
the discharge rate regulating part includes:
a diaphragm part being a part of the film and being disposed to block a communication between a channel on a downstream side relative to the pressure reduction part and an inside of the tube,
a valve seat part depressed with respect to the diaphragm part and disposed at a position where the valve seat part faces the diaphragm part in the channel on the downstream side relative to the pressure reduction part without making contact with the diaphragm part, but the valve seat part being capable of making close contact with the diaphragm part,
a hole opening at the valve seat part and communicating with the discharge part, and
a groove formed on the valve seat part and configured to communicate between the hole and the channel on outside relative to the valve seat part;

the diaphragm part makes close contact with the valve seat part when the pressure of the irrigation liquid in the tube is equal to or higher than a predetermined value, the emitter main body and the film are molded integrally with one type of flexible material; and the film turns about a hinge part connecting the emitter main body and the film, and is joined to the emitter main body.

5. The emitter according to claim 1, wherein:

the emitter main body further includes at least one protrusion on a surface to which the film is joined, and the film has at least one positioning hole into which the protrusion is fitted.

6. The emitter according to claim 1, wherein the emitter main body and the film are joined together by bonding, pressure bonding, or welding.

7. A trickle irrigation tube comprising:

a tube; and at least one emitter, the emitter being the emitter according to claim 1 disposed on the tube.

8. The emitter according to claim 1, wherein:

the intake part includes a screen part for catching a floating material in the irrigation liquid, and the screen part includes:

a slit formed in the film, and a recess formed in the emitter main body so as to be in communication with the slit and to extend in a direction orthogonal to a longitudinal direction of the slit.

9. The emitter according to claim 4, wherein:

the emitter main body further includes at least one protrusion on a surface to which the film is joined, and the film has at least one positioning hole into which the protrusion is fitted.

10. The emitter according to claim 4, wherein the emitter main body and the film are joined together by bonding, pressure bonding, or welding.

11. The emitter according to claim 4, wherein:

the intake part includes a screen part for catching a floating material in the irrigation liquid, and the screen part includes:

a slit formed in the film, and a recess formed in the emitter main body so as to be in communication with the slit and to extend in a direction orthogonal to a longitudinal direction of the slit.

12. A trickle irrigation tube comprising:

a tube; and at least one emitter, the emitter being the emitter according to claim 4 disposed on the tube.

\* \* \* \* \*